United States Patent [19]

Alston

[11] Patent Number: 4,710,824

[45] Date of Patent: Dec. 1, 1987

[54] SYSTEM AND METHOD FOR IMPROVING CHROMINANCE IN VIDEO DISC STORAGE SYSTEM

[75] Inventor: Lawrence E. Alston, Chelmsford, Mass.

[73] Assignee: Polaroid Corporation, Cambridge, Mass.

[21] Appl. No.: 848,156

[22] Filed: Apr. 4, 1986

[51] Int. Cl.[4] .............................................. H04N 9/80
[52] U.S. Cl. .................................... 358/310; 358/312; 358/12
[58] Field of Search ............... 358/310, 313, 330, 334, 358/906, 12, 14, 23

[56] References Cited

U.S. PATENT DOCUMENTS

| | | | |
|---|---|---|---|
| 4,163,248 | 7/1979 | Heitmann | 358/14 |
| 4,491,861 | 1/1985 | Sochor | 358/310 |
| 4,516,151 | 5/1985 | Stahler | 358/14 |
| 4,553,175 | 11/1985 | Baumeister | 358/310 |
| 4,574,300 | 3/1986 | Hulyer | 358/12 |

Primary Examiner—Donald McElheny, Jr.
Attorney, Agent, or Firm—Edward S. Roman

[57] ABSTRACT

An apparatus and method are provided for encoding and decoding video signals on a conventional magnetic recording medium in a manner whereby the decoded video signal includes an improved chrominance characteristic. The improved chrominance characteristic is provided by encoding the conventional luminance and chrominance information signals on a first track of the information recording medium for the odd alternate fields and a modified luminance information signal and a select separate color component signal on a second track of the information recording medium. The signal recorded on the first track of the recording medium may be decoded in a conventional manner to provide video signals of limited chrominance video bandwidth or, alternatively, both tracks of the recording medium may be decoded in the manner of this invention to provide an improved chrominance characteristic video signal.

21 Claims, 4 Drawing Figures

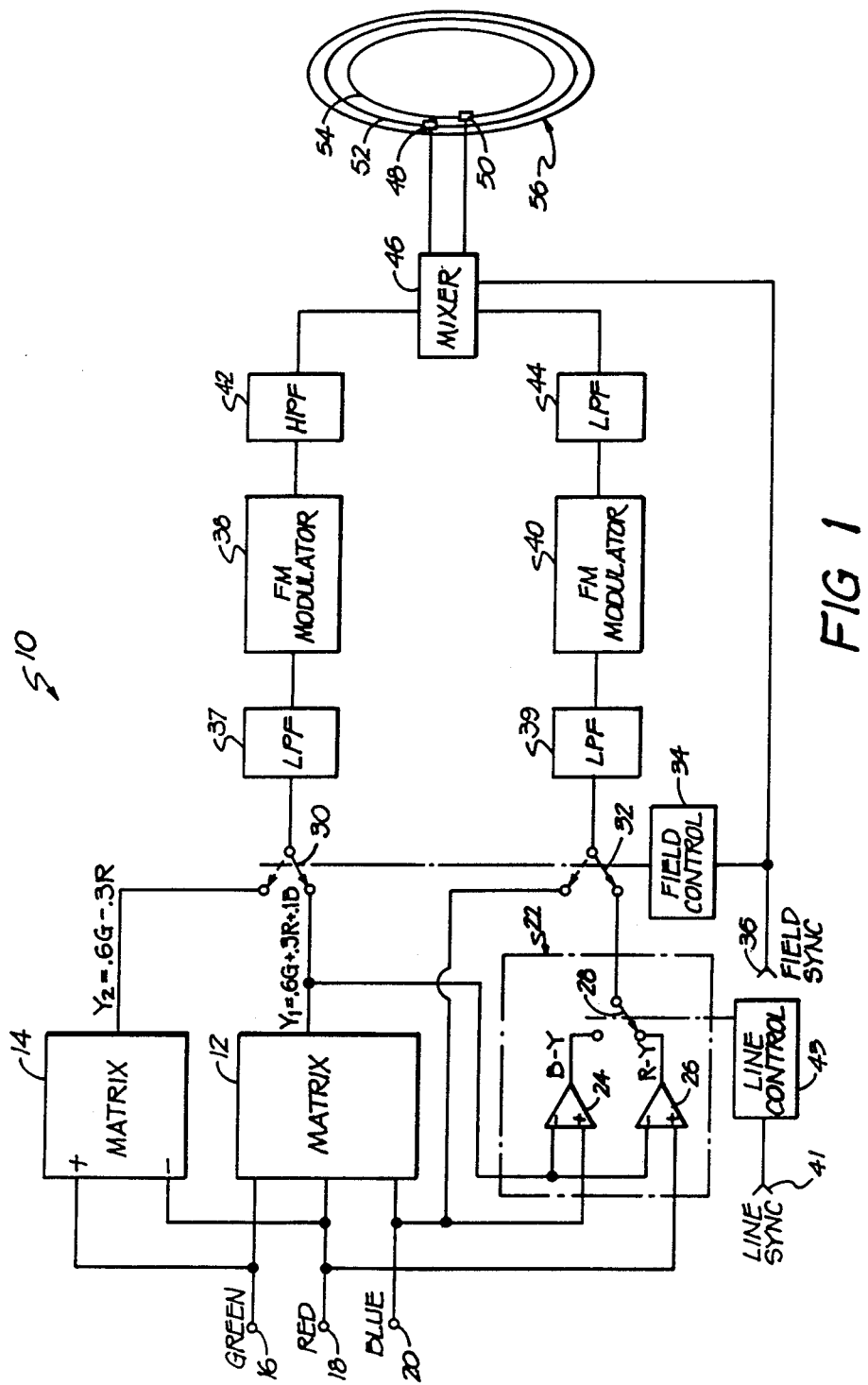

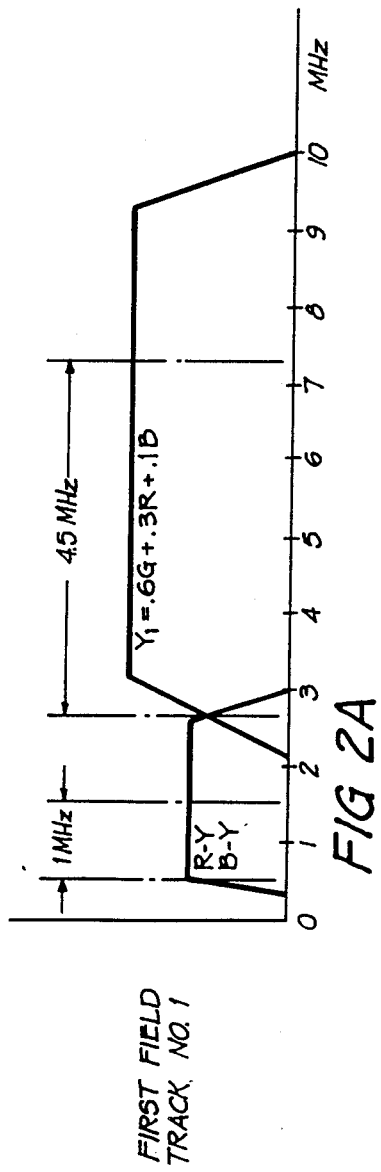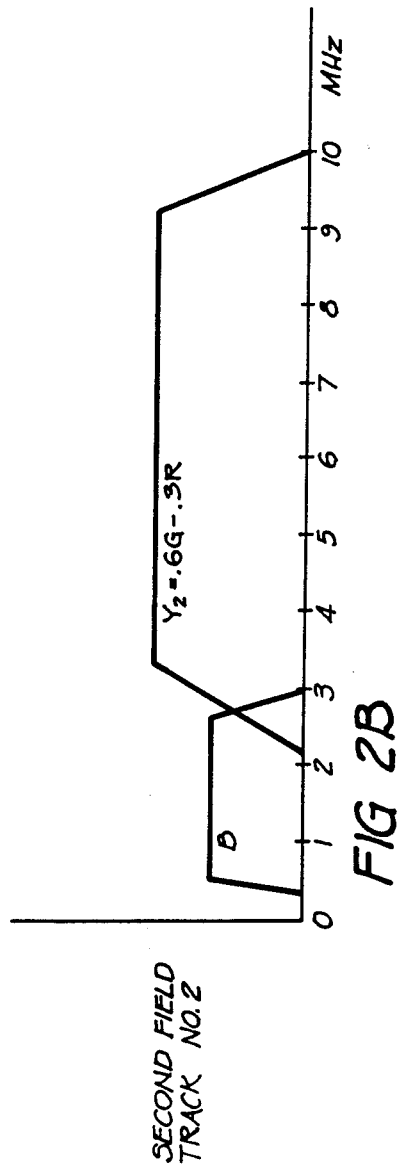

4,710,824

SYSTEM AND METHOD FOR IMPROVING CHROMINANCE IN VIDEO DISC STORAGE SYSTEM

BACKGROUND OF THE INVENTION

1. Field of the Invention

This invention relates generally to an improved chrominance video system and, more particularly, to an apparatus and method for encoding and decoding video signals with an improved chrominance characteristic.

2. Description of the Prior Art

Electronic imaging cameras for recording still images are now well known in the art. Such cameras can record a plurality of still images on a single magnetic disk or tape in either analog or digital format for subsequent playback on any well known cathode ray tube viewing device or for subsequent recording in hard copy by any one of a variety of copiers such as photographic, thermal, ink jet, etc. Recently, it has been proposed by the Japanese to standardize the magnetic disk in which still images are recorded to a 47 mm floppy disk. However, conventional specifications for storing electronic information on a 47 mm floppy disk suffers as a result of limited chrominance video bandwidth. For example, if 25 full frames or 50 single field images are stored on a conventional 47 mm floppy disk, the Y luminance information signal has a bandwidth of 4.5 MHz and each sequential line of chrominance information (R-Y and B-Y) has a bandwidth of 1 MHz. This limited chrominance signal bandwidth can adversely effect edge color definition.

Therefore, it is a primary object of this invention to provide an apparatus and method by which video signals may be encoded and decoded on a conventional 47 mm floppy disk with an improved chrominance characteristic.

It is a further object of this invention to provide a method and apparatus for encoding and decoding video signals utilizing two tracks of a conventional floppy disk in which one track may be decoded in the ordinary manner with the attendant disadvantages of a limited chrominance bandwidth and both tracks may be decoded in the manner of this invention with the advantages attendant an improved chrominance signal characteristic.

Other objects of the invention will be, in part, obvious and will, in part, appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1 is a schematic block diagram of the encoding circuit of this invention;

FIGS. 2A and 2B show graphical representations of video signals recorded in the manner of this invention.

SUMMARY OF THE INVENTION

Figure 3:
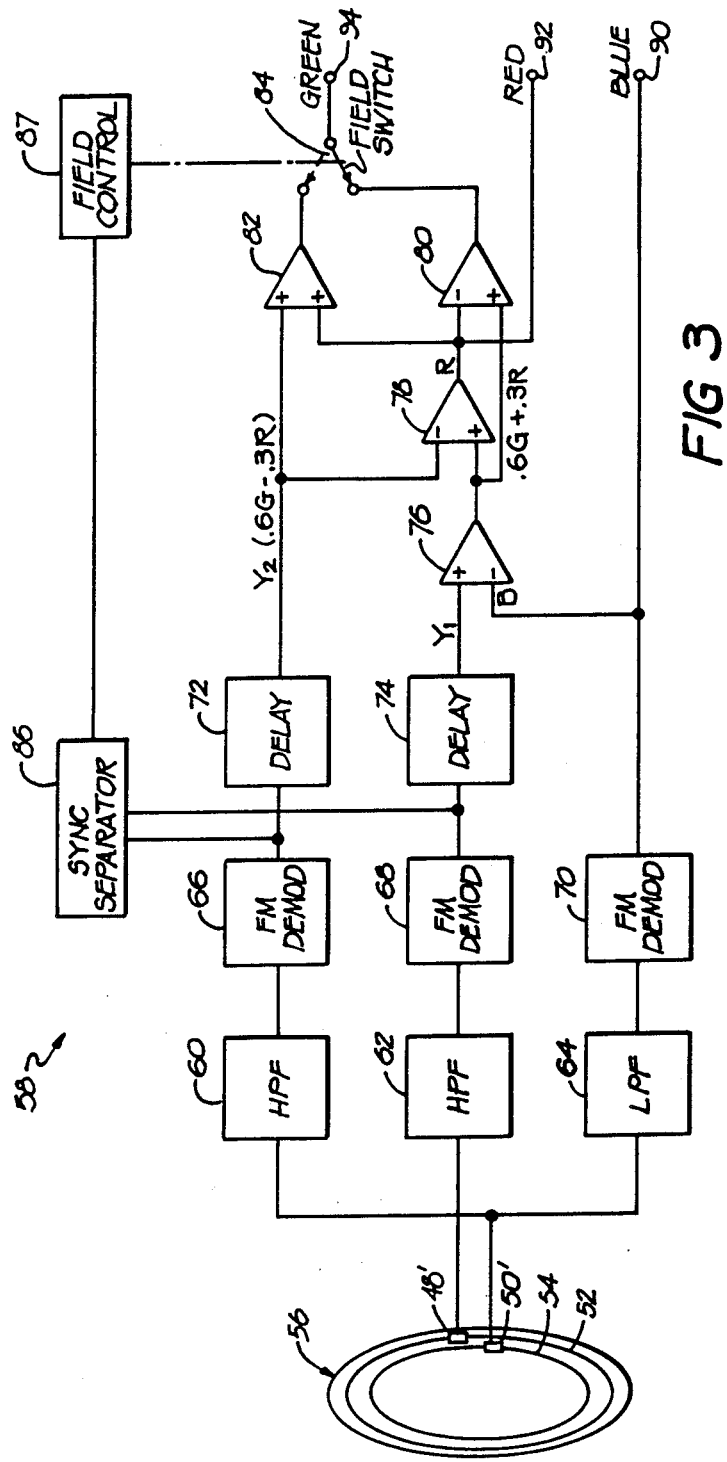
FIG. 3 is a schematic block diagram for the decoding circuit of this invention.

The invention relates to an apparatus and method for coding a video signal of the type comprising at least three separate color component signals for recording on a suitable storage medium such as a conventional 47 mm floppy disk. A first luminance type signal is provided as a function of the sum of select portions of the three separate color component signals, and a second luminance type signal is provided as a function of the difference between select portions of two of the three separate color component signals. A chrominance type signal is also provided as a function of the respective differences between the first luminance type signal and at least two of the separate color component signals. The first luminance type signal corresponds to first alternate fields of the video signal and is provided for recording within a first select bandwidth. The second luminance type signal corresponds to second alternate fields disposed between every other field of the first alternate fields of the video signal and is also provided for recording within the first select bandwidth. The chrominance type signal corresponds to the first alternate fields of the video signal and is provided for recording within a second select bandwidth below the first select bandwidth along with one select separate color component signal corresponding to the second alternate fields.

Upon decoding, the first luminance type signal is combined with the one select separate color component signal in a manner whereby the one separate color component signal is removed from the first luminance type signal. The second luminance type signal is thereafter subtracted from the aforementioned signal from which the one select separate color component signal was previously removed to provide a second separate color component output signal. The second separate color component output signal is also subtracted from the aforementioned signal from which the one select separate color component signal was previously removed to provide a third separate color component signal for the first alternate fields. The second color component signal is also added to the second luminance type signal to provide a third separate color component signal for the second alternate fields, and the one select color component signal is directly decoded.

DESCRIPTION OF THE PREFERRED EMBODIMENTS

Referring now to FIG. 1, there is shown the improved chrominance video encoding circuit 10 of this invention comprising a first matrix circuit 12 and a second matrix circuit 14. Matrix circuit 12 receives three separate color component signals, green, red, and blue, at respective input terminals 16, 18 and 20 and operates in a well-known manner to matrix the three separate color component signals to provide a first luminance information output signal $Y_1 = 0.6G + 0.3R + 0.1B$. Matrix circuit 14 operates to matrix the green and red separate color component signals to provide a second luminance information signal $Y_2 = 0.6G - 0.3R$ as a function of the difference between the green and red separate color component signals.

The first and second luminance information signals $Y_1$ and $Y_2$ from the matrix circuits 12 and 14 respectively are directed by way of a switch contact 30 to a low pass filter 37 and then to an FM modulator 38 which operates in a well-known manner to FM modulate the first and second luminance information signals within a 4.5 MHz bandwidth. The low pass filter 37 operates to bandwidth limit the input signal to 4.5 MHz to the FM modulator 38 in order to prevent high frequency interference with the modulator 38. The output signal from the FM modulator 38, in turn, is directed to a high pass filter 42 for filtering out the low frequency components of the signal, i.e., those frequency components below 2.7 MHz. The high pass filtered first and second luminance information signals are thereafter directed by way of a mixer circuit 46 for recording by a first magnetic head 48 on a first track 52 of a magnetic recording disk 56 which may be of the aforementioned 47 mm floppy disk type or, alternatively, by a second magnetic head 50 on a second track 54 of the recording disk 56 in a manner as will be subsequently described.

The red and blue separate color component signals are directed, respectively, to the positive input terminals of a pair of subtractors 26 and 24 within a chrominance information signal providing circuit as shown generally at 22. The negative input terminals of the subtractors 24 and 26 are in common connection with respect to each other and receive the first luminance information signal $Y_1$ from the output of the matrix circuit 12. The outputs from the subtractors 24 and 26 are directed by way of a switch contact 28 to the output terminal of the chrominance information signal providing circuit 22. A switch contact 32 ganged to operate in synchronism with the switch contact 30 operates to switch between the blue separate color component signal from input terminal 20 and the output chrominance information signal from the chrominance information signal providing circuit 22.

The switch contact 28 operates as a function of a line control circuit 43 controlled by the line sychronization pulses received from input terminal 41 in a manner as is well known in the art. The switch contacts 30 and 32 are controlled from a field control circuit 34 which operates as a function of the field synchronization signal received at input terminal 36 in a manner as is also well known in the art. As will be readily understood, although the switch contacts 28, 30 and 32 are diagrammatically shown for purposes of illustration as having mechanical switching elements, it will be well understood that the preferred switching components would be of a semiconductor type as is again well known in the art.

The output signal from the switch contact 32, in turn, is directed to a low pass filter 39 and then to an FM modulator circuit 40 for frequency modulation within a relatively narrow 1 MHz bandwidth. The low pass filter 39 operates in the aforementioned manner to bandwidth limit the input signal to 1 MHz to the FM modulator 40 in order to prevent high frequency interference with the modulator 40. The output signal from the FM modulator 40, in turn, is directed to a low pass filter 44 for filtering out the high frequency components of the signal, i.e., those frequency components above 2.7 MHz. The output signal from the low pass filter 44, in turn, is directed by way of a mixer for recording by recording heads 48 and 50 on respective tracks 52 and 54 of the magnetic disk 56 in the manner of this invention to be subsequently described.

Operation of the improved chrominance encoding circuit 10 of this invention proceeds as follows. The green, red and blue separate color component signals are matrixed in the conventional manner by matrix circuit 12 to provide the first luminance information signal $Y_1=0.6G+0.3R+0.1B$. The second matrix circuit 14 operates to provide the second luminance information signal $Y_2=0.6G-0.3R$, as a function of the difference between the green and red separate color component signals. The first and second luminance information signals $Y_1$, $Y_2$ are directed by way of the switch contact 30 and low pass filter 37 to the FM modulator 38 as a function of the field control circuit 34 and its input field synchronization signal 36. Thus, the first luminance information signal $Y_1$ is directed from the matrix circuit 12 by way of the low pass filter 37 to the FM modulator 38 during first alternate fields of the video signal. The second luminance information signal $Y_2$ is directed from the matrix circuit 14 by way of the switch contact 30 and low pass filter 37 to the FM modulator 38 during second alternate fields disposed between every other field of the first alternate fields. Thus, during every odd field, the first luminance information signal $Y_1$ is conducted by way of the switch contact 30 and low pass filter 37 from the matrix circuit 12 for modulation by the FM modulator 38 while during every even field, the second luminance information signal $Y_2$ is conducted by way of the switch contact 30 and low pass filter 37 from the matrix circuit 14 for modulation by the FM modulator 38. Thus, in this manner the FM modulator 38 alternately modulates the first and second luminance information signals.

As previously discussed, the FM modulator 38 operates to modulate the first and second luminance information signals within a 4.5 MHz bandwidth and the signal is thereafter filtered to remove any lower frequency components by the high pass filter 42, i.e., those frequency components below 2.7 MHz. The modulated filtered signal is thereafter directed by the mixer 46 for recording by the head 48 on the first track 52 or by the head 50 on the second track 54 of the magnetic recording disk 56. The mixer 46 is synchronized from the field synchronization signal as received at terminal 36 to record the first luminance information signal $Y_1$ corresponding to the odd alternate fields on the first track 52 and the second luminance information signal $Y_2$ corresponding to the alternate even fields on the second track 54 of the magnetic recording disk 56. Thus, in this manner the luminance information signal $Y_1$ corresponding to the first odd fields is recorded on the first track 52 by the head 48 within the 4.5 MHz bandwidth as shown in FIG. 2A. Similarly, the second luminance information signal $Y_2$ corresponding to the second even fields is recorded on the second track 54 by the head 50 within the same 4.5 MHz bandwidth as shown in FIG. 2B.

The chrominance signal providing circuit 22 operates by way of the subtractor 24 to provide a first component of the chrominance information signal as a function of the difference between the blue separate color component signal and the first luminance information signal $Y_1$. A second component of the chrominance information signal is provided by the subtractor 26 as a function of the difference between the red separate color component signal and the first luminance information signal $Y_1$. The first and second components of the chrominance information signal are directed out of the chrominance signal providing circuit 22 by way of the switch contact 28 which is switched by the line control circuit 43 as a function of the line synchronization signal received at the input terminal 41. The output chrominance information signal provided by the chrominance signal circuit 22 is directed by way of the switch contact 32 and low pass filter 39 to the FM modulator 40 during the aforementioned first odd fields since the switch contact 32 is switched in synchronism with the switch contact 30 by the field control circuit 34 as a function of the input field synchronization pulses received at the terminal 36. The blue separate color component signal is directed by the switch contact 32 during the second even fields to the FM modulator 40. Thus, the FM modulator 40 operates to modulate the chrominance information signal corresponding to the first odd fields alternately with the blue separate color component signal corresponding to the second even fields within a 1 MHz bandwidth.

The modulated signal is thereafter filtered by the low pass filter 44 to remove the high frequency components, i.e., those frequency components above 2.7 MHz, and thereafter directed for recording by the mixer 46 on the appropriate track of the magnetic disk 56. The mixer 46 which is synchronized by the field sync signal from terminal 36 operates to direct the chrominance information signal as shown in FIG. 2A for recording by the head 48 onto the track 52. Similarly, the mixer 46 operates to direct the blue separate color component signal corresponding to the second even fields for recording on the second track 54 by way of the head 50 as shown in FIG. 2B.

Thus, it can be seen that the first track 52 stores the first luminance information signal $Y_1$ within a 4.5 MHz bandwidth and the chrominance information signal within a 1 MHz bandwidth for the first odd fields of the video signal. This signal can be retrieved in a conventional manner in conformance with the aforementioned Japanese specification to provide a recorded image in which the odd and even fields are defined by the signal recorded on the first track. It is also readily apparent that the second luminance information signal $Y_2$ from which the blue separate color component signal has been subtracted is recorded on the second track 54 within the 4.5 MHz bandwidth while the blue separate color component signal is recorded on the second track within a 1 MHz bandwidth. The second luminance information signal $Y_2$ and the blue separate color component signal recorded on the second track may be retrieved in combination with the first luminance information signal $Y_1$ recorded on the first track to provide improved chrominance in the separate color component signals from which an image recording may be made.

Toward that end there is provided the improved chrominance color decoding circuit of FIG. 3 where like numerals designate previously described elements. Playback head 50' converts the magnetically recorded information signal to an electronic information signal which, in turn, is directed to a high pass filter 60 in which the low frequency components of the signal are removed and a low pass filter 64 in which the high frequency components of the signal are removed. The modulated second luminance information signal $Y_2$ is thereafter FM demodulated by the FM demodulator circuit 66 and subsequently delayed by the delay circuit 72 to appropriately synchronize the timing of the second luminance information signal $Y_2$ to the blue separate color component signal as is well known in the art. A sync separator circuit 86 derives the field synchronization pulses from the second luminance information signal $Y_2$ to input a field control circuit 87 so as to enable it to control the switching of a field switch contact 84. As previously discussed, although the field switch contact 84 is diagrammatically shown as being a mechanical switch contact, it will be readily understood that semiconductor switches would be preferred.

The playback head 50' also retrieves the magnetically recorded information signal on track 54 corresponding to the blue separate color component signal which is subsequently low pass filtered by the low pass filter 64 to remove the high frequency components therefrom. The blue separate color component signal is thereafter FM demodulated by the FM demodulator circuit 70 and thereafter directed to the negative input terminal of a subtractor circuit 76. A playback head 48' detects the magnetically recorded information signal on the first track 52 at the same time that the playback head 50' detects the magnetically recorded information signal on the second track 54. The output signal from the playback head 48' is high pass filtered by a high pass filter 62 to remove the low frequency components therefrom and thereafter FM demodulated by an FM demodulator circuit 68 to provide the first luminance information signal $Y_1$. The sync separator circuit 86 derives field synchronization pulses from the first luminance information signal $Y_1$ in the aforementioned manner. The first luminance information signal $Y_1$ is thereafter delayed by the delay circuit 74 to synchronize its timing with the blue separate color component signal as is well known in the art.

The delayed first luminance information signal $Y_1$ is thereafter directed to the positive input terminal of the subtractor circuit 76 from whence the blue separate color component signal is subtracted to provide an output signal equal to the sum of the green and red separate color component signals (0.6 G+0.3 R). The output signal from the subtractor 76, in turn, is directed to the positive input terminal of another subtractor circuit 78 which receives the second luminance information signal $Y_2$ at its negative input terminal. Subtracting the second luminance information signal $Y_2$ from the output signal of the subtractor circuit 76 operates to provide a signal corresponding to the red separate color component signal which is directed to output terminal 92. The blue separate color component signal is output directly at output terminal 90.

The red separate color component signal output from the subtractor circuit 78, in turn, is directed to the negative input terminal of another subtractor circuit 80 which has a positive input terminal connected to receive the output signal (0.6 G+0.3 R) from the subtractor circuit 76. Subtraction of the red separate color component signal by the subtractor circuit 80 provides a green separate color component output signal corresponding to the first odd fields. This output signal, in turn, is directed by way of the field switch contact 84 to a green separate color component signal output terminal 94.

The red separate color component output signal from the subtractor circuit 78, in turn, is directed to one input terminal of an adder circuit 82, the other input terminal of which receives the second luminance information signal $Y_2$. Adding the red separate color component signal to the second luminance information signal $Y_2$ operates to provide an output signal corresponding to the green separate color component signal for the second even fields which signal is directed to the output terminal 94 by way of the field switch 84. Thus, the field switch contact 84 operates to switch between two green separate color component signals corresponding, respectively, to the odd and even alternate fields.

It can now be seen that the improved chrominance video encoding and decoding circuits of this invention provide a means by which three separate color component signals may be recorded on two tracks of a standard magnetic disk and thereafter retrieved in either a conventional manner in conformance with the aforementioned Japanese specification or in the improved chrominance manner of this invention to provide the three separate color component signals from which an image may be recorded in hard copy in any conventional manner. The improved chrominance is derived by recording a modified luminance information signal from which one of the separate color component signals is separated within a relatively wide 4.5 MHz bandwidth on a second track of the magnetic recording medium, i.e., 47 mm floppy disk, while recording the subtracted color component signal within a relatively narrow 1 MHz bandwidth on the same second track of the recording medium. In the preferred embodiment the separate color component signals are green, red and blue where blue is recorded at the narrower 1 MHz bandwidth. Since the blue separate color component signal is weighted to provide less of an influence in the quality of the ultimately recorded image, it is possible to record the blue separate color component signal within the substantially narrow 1 MHz bandwidth without substantially adversely affecting the improved chrominance characteristic of the recorded image. The aforementioned system in addition is downward compatible with conventional systems wherein the conventional first luminance information signal $Y_1$ and chrominance information signal recorded on the first track 52 of the magnetic recording medium can be retrieved and decoded by any conventional still image video decoding circuit that conforms to the aforementioned Japanese specification. In addition, it will be readily understood that each of the subtractor and adder circuits include conventional circuitry (not shown) for appropriately scaling the input signals so that the signals are combined in the described manner.

Other embodiments of the invention including additions, subtractions, deletions and other modifications of the preferred disclosed embodiments of the invention will be obvious to those skilled in the art and are within the scope of the following claims.

What is claimed is:

1. A system for encoding a video signal into a format suitable for recording wherein the video signal is of the type comprising at least three separate color component signals comprising:

first means for providing a first luminance type output signal as a function of the sum of select portions of the three separate color component signals;

second means for providing a second luminance type output signal as a function of the difference between select portions of two of the three separate color component signals;

third means for providing a chrominance type output signal as a function of the respective differences between said first luminance type signal and at least two of the separate color component signals; and fourth means responsive to the output signals from said first, second and third means and the video signal for providing: said first luminance type signal in correspondence with first alternate fields of the video signal in a format suitable for recording within a first select bandwidth; said second luminance type signal in correspondence with second alternate fields disposed between every other field of said first alternate fields of the video signal in a format suitable for recording within said first select bandwidth, said chrominance type signal in correspondence with said first alternate fields of the video signal in a format suitable for recording within a second select bandwidth below said first select bandwidth, and one select separate color component signal in correspondence with said second alternate fields in a format suitable for recording within said second select bandwidth.

2. The system of claim 1 wherein said means for providing signals in a format suitable for recording comprises: a first low pass filter for filtering said first and second luminance type output signals received, respectively, from said first and second means, a first FM modulator for modulating the output signal from said first low pass filter, a high pass filter for receiving the output from said FM modulator and providing said first and second luminance type signals suitably formatted for recording within said first select bandwidth, a second low pass filter for filtering said chrominance type signal received from said third means and said one select separate color component signal received directly from the video signal, a second FM modulator for modulating the output signal from said second low pass filter, and third low pass filter for receiving the output from said second FM modulator and providing said chrominance type signal and said one select separate color component signal both suitably formatted for recording within said second select bandwidth.

3. The system of claim 2 wherein said fourth means for providing signals in a format suitable for recording comprises first switch means for switching: the output signal from said first means to connect to the input of said first low pass filter only during said first alternate fields, the output signal from said second means to connect to the input of said first low pass filter only during said second alternate fields, the output from said third means to connect to the input of said second low pass filter only during said first alternate fields, and said one select separate color component signal to connect to the input of said second low pass filter only during said second alternate fields.

4. The system of claim 3 wherein said fourth means comprises means for combining the outputs from said high pass filter and said third low pass filter to provide said first and second luminance type signals, said chrominance type signal and said one select separate color component signal all in formats suitable for recording within said first and second select bandwidths on a magnetic recording medium.

5. The system of claim 4 wherein said third means comprises means for providing a first component of said chrominance type output signal as a function of the difference between a second select color component signal and said first luminance type output signal from said first means, a second component of said chrominance type output signal as a function of the difference between a third select color component signal and said first luminance type output signal from said first means, and second switch means for alternately stitching between said first and second components of said chrominance type signal at a rate at least twice the rate at which said first switch means switches to provide said chrominance type output signal.

6. The system of claim 5 wherein said first means operates as a function of the sum of select portions of red, green and blue component signals, said second means operates as a function of the difference of select portions of green and red component signals, said means for providing said first component of said chrominance type output signal operates as a function of the difference between a blue color component signal and said first luminance type output signal from said first means, and said means for providing said second component of said chrominance type output signal operates as a function of the difference between a red color component signal and said first luminance type output signal from said first means.

7. The system of claim 1 in combination with recording means for use with a two track recording medium, said recording means responding to the output from said fourth means to provide a record of said first luminance type signal and said chrominance type signal in correspondence with said first alternate fields of the video signal on a first track of the recording medium and a record of said second luminance type signal and said one select separate color component signal in correspondence with said second alternate fields of the video signal on a second track of the recording medium.

8. The system of claim 7 in combination with means for deriving said first luminance type signal from the first track of the recording medium and said second luminance type signal and said one select separate color component signal from the second track of the recording medium, first difference means for combining said derived first luminance type signal with said derived one select separate color component signal so as to subtract said derived one separate color component signal from said derived first luminance type signal, second difference means for subtracting said derived second luminance type signal from the output signal of said first difference means to provide a derived second separate color component signal, third difference means for subtracting said derived second separate color component signal from the output signal of said first difference means to provide a derived third separate color component signal for said first alternate fields, and adding means for combining said derived second color component signal with said derived second luminance type signal to provide a derived third separate color component signal for said second alternate fields.

9. The system of claim 8 wherein said means for deriving includes: a first high pass filter for receiving the signal from the first track of the recording medium and providing an output signal within said first select bandwidth, a first FM demodulator for demodulating the output signal from said first high pass filter to provide said derived first luminance type signal, a second high pass filter for receiving the signal from the second track of the recording medium and providing an output signal within said first select bandwidth, a second FM demodulator for demodulating the output signal from said second high pass filter to provide said derived second luminance type signal, a low pass filter for receiving the signal from the second track of the recording medium and providing an output signal within said second select bandwidth, a third FM demodulator for demodulating the output signal from said low pass filter to provide said derived one select separate color component signal.

10. The system of claim 9 including third switch means for alternately switching between said derived third color component signal for said first alternate fields and said derived third color component signal for said second alternate fields at a rate corresponding to the field rate.

11. The system of claim 10 wherein said derived one select separate color component signal corresponds to blue, said derived second color component signal corresponds to red and said derived third color component signal corresponds to green.

12. A method for encoding a video signal of the type comprising at least three separate color component signals comprising:
summing select portions of the three separate color component signals to provide a first luminance type signal within a first select bandwidth corresponding to first alternate fields of the video signal;
subtracting select portions of two of the three separate color component signals to provide a second luminance type signal within said first select bandwidth corresponding to second alternate fields disposed between every other field of said first alternate fields of the video signal;
subtracting said first luminance type signal from at least two of the separate color component signals to provide a chrominance type signal within a second select bandwidth below said first select bandwidth, said chrominance type signal corresponding to said first alternate fields of the video signal; and
providing a select one of the three separate color component signals within said second select bandwidth and corresponding to said second alternate fields of the video signal.

13. The method of claim 12 further comprising the steps of low pass filtering said first and second luminance type signals subsequent, respectively, to the summing and subtraction of said select portions of the three separate color component signals, FM modulating said low pass filtered first and second luminance type signals, high pass filtering said first and second luminance type signals subsequent to their FM modulation, low pass filtering said chrominance type signal subsequent to the subtraction of said first luminance type signal from at least two of the separate color component signals and low pass filtering said one select separate color component signal, FM modulating said low pass filtered chrominance type signal and said one select separate color component signal, and low pass filtering said chrominance type signal and said one select separate color component signal subsequent to FM modulation.

14. The method of claim 13 further comprising the steps of connecting said first luminance type signal for low pass filtering and subsequent FM modulation only during said first alternate fields, connecting said second luminance type signal for low pass filtering and subsequent FM modulation only during said second alternate fields, connecting said chrominance type signal for low pass filtering and subsequent FM modulation only during said first alternate fields and connecting said select separate color component signal for low pass filtering and subsequent FM modulation only during said second alternate fields.

15. The method of claim 14 further comprising the steps of combining the high and low pass filtered FM modulated outputs to provide a signal suitable for recording within said first and second select bandwidths on a magnetic recording medium.

16. The method of claim 15 wherein said step of subtracting said first luminance type signal from at least two of the separate color component signals comprises the steps of subtracting said first luminance type signal from a second select color component signal to provide a first component of said chrominance type signal and subtracting said first luminance type signal from a third select color component signal to provide a second component of said chrominance type signal.

17. The method of claim 16 wherein said first luminance type signal is provided as a function of the sum of select portions of red, green, and blue color component signals, said second luminance type signal is provided as a function of the difference of select portions of green and red color component signals, said first component of said chrominance type signal is a function of the difference between a blue color component signal and said first luminance type signal, and said second component of said chrominance type signal is a function of the difference between a red color component signal and said first luminance type signal.

18. A method for decoding a video signal encoded on a first track of a recording medium from a first luminance type signal corresponding to first alternate fields of the video signal and encoded on a second track of the recording medium from a second luminance type signal and one select separate color component signal corresponding to second alternate fields disposed between every other field of said first alternate fields, said method comprising the steps of:
   deriving first and second luminance type signals, and one select separate color component signal from the recording medium;
   subtracting said one select separate color component signal from the first luminance type signal so as to remove said one separate color component signal from said first luminance type signal to provide a select two color component signal;
   subtracting said second luminance type signal from said select two color component signal to provide a second separate color component signal;
   subtracting said second separate color component signal from said select two color component signals to provide a third separate color component signal for the first alternate fields; and
   adding said second color component signal with said second luminance type signal to provide a third separate color component signal for the second alternate fields.

19. The method of claim 18 wherein said step for deriving first and second luminance type signals and one select separate color component signal from the recording medium comprises the steps of: high pass filtering the signal received from the first track of the recording medium to provide an output signal within a first select bandwidth, FM demodulating the high pass filtered output signal to provide said first luminance type signal, high pass filtering the signal received from the second track of the recording medium to provide an output signal within the first select bandwidth, FM demodulating the high pass filtered output signal from the second track to provide said second luminance type signal, low pass filtering the signal received from the second track of the recording medium to provide an output signal within a second select bandwidth lower than said first select bandwidth, and FM demodulating the low pass filtered output signal to provide said one select separate color component signal.

20. The method of claim 19 further comprising the steps of alternately switching between said third color component signal for said first alternate fields and said third color component signal for said second alternate fields at a rate corresponding to the field rate.

21. The method of claim 20 wherein said one select separate color component signal corresponds to blue, said second color component signal corresponds to red and said third color component signal corresponds to green.

* * * * *